United States Patent [19]

Lukes et al.

[11] 4,136,558

[45] Jan. 30, 1979

[54] ELECTRONIC TEST INSTRUMENT FOR MEASURING THE SPEED AND TIMING ANGLE OF AN INTERNAL COMBUSTION ENGINE

[75] Inventors: Henry J. Lukes, Bellevue; Walter Kamphorst, Redmond, both of Wash.

[73] Assignee: Sundstrand Data Control, Inc., Rockford, Ill.

[21] Appl. No.: 805,247

[22] Filed: Jun. 7, 1977

[51] Int. Cl.² ........................................... G01M 15/00
[52] U.S. Cl. ................................................ 73/119 A
[58] Field of Search ...................... 73/116, 118, 119 A, 73/117.3; 324/16 T

[56] References Cited

U.S. PATENT DOCUMENTS

| Re. 28,904 | 7/1976 | Maisonville | 324/16 R |
| 3,883,795 | 5/1975 | Klein et al. | 324/16 R |

*Primary Examiner*—Jerry W. Myracle
*Attorney, Agent, or Firm*—Ted E. Killingsworth; Michael B. McMurry; William R. Peoples

[57] ABSTRACT

Direct readings of the timing angle and duration of the fuel injection of a diesel engine along with the engine speed are provided by an electronic test instrument that converts the duration of the timing advance and the duration of one engine revolution into electrical pulses of corresponding width. Both these pulse widths are then converted to corresponding electrical quantities and the quantity which corresponds to the timing angle is divided by the quantity which corresponds to one engine revolution to produce an indication of timing angle, or alternatively a constant reference quantity is divided by the quantity which corresponds to the engine revolution, thus providing an indication the engine speed.

60 Claims, 8 Drawing Figures

ELECTRONIC TEST INSTRUMENT FOR MEASURING THE SPEED AND TIMING ANGLE OF AN INTERNAL COMBUSTION ENGINE

BACKGROUND OF THE INVENTION

The invention relates to the field of electronic internal combustion engine test equipment and more particularly to instruments for measuring timing advance and engine speed.

In timing internal combustion engines the typical practice has been to use timing lights such as stobe lamps to illuminate a marker on the engine flywheel or damper and to compare its position with a reference mark located on the engine body. Since the prior art techniques are of limited accuracy and dependent on the abilities of the observer and since greater requirements for fuel economy and pollution control call for engine timing standards of far higher accuracy, the need for an instrument to provide high accuracy reading of engine timing angle and speed has become apparent.

SUMMARY OF THE INVENTION

It is therefore an object of the invention to provide an instrument for directly displaying the timing angle of an internal combustion engine.

It is another object of the invention to provide a measuring instrument for internal combustion engines wherein a chosen parameter of an electrical signal representing the time duration of the timing angle of advance is divided by a chosen parameter of an electrical signal representing the time duration of one revolution.

It is a further object of the invention to provide a timing instrument for a diesel engine wherein an electrical pulse signal whose width is representing the time period from fuel injection to when the piston reaches a top dead center position is converted into either a digital signal or a voltage representing this time period and an electrical pulse signal, wherein the pulse width which is proportional to the time of one engine revolution is converted into either a digital or a voltage representing one engine revolution are used to generate signals representing timing angles and engine speed.

Referring to diesel engines in particular, fuel is injected into the cylinder slightly before its piston reaches its top dead center (TDC) position, i.e. in an instant which corresponds to a so-called "advance angle of injection." The measuring device should read this angle in angular degrees, i.e. to determine the time interval from the instant when the fuel pressure exceeds a predetermined level thus causing the injector to inject fuel in the cylinder to the instant when the piston arrives at the top dead center position in the cylinder. In most engines, a marker is located on the flywheel to indicate the position of the piston on the first cylinder. But to measure this interval alone would not be sufficient to determine the advance angle since the same time interval can correspond to different angles according to the engine speed. It is, therefore, necessary to also measure the time duration of one full revolution and to compare both these intervals. If we designate the first interval, i.e. that from the fuel injection to the top dead center position, as t and the duration of one revolution as T, then the advance angle in angular degrees is given by the formula:

$$\alpha = t/T \cdot 360 \qquad (1)$$

DETAILED DESCRIPTION OF THE INVENTION

Figure 1:
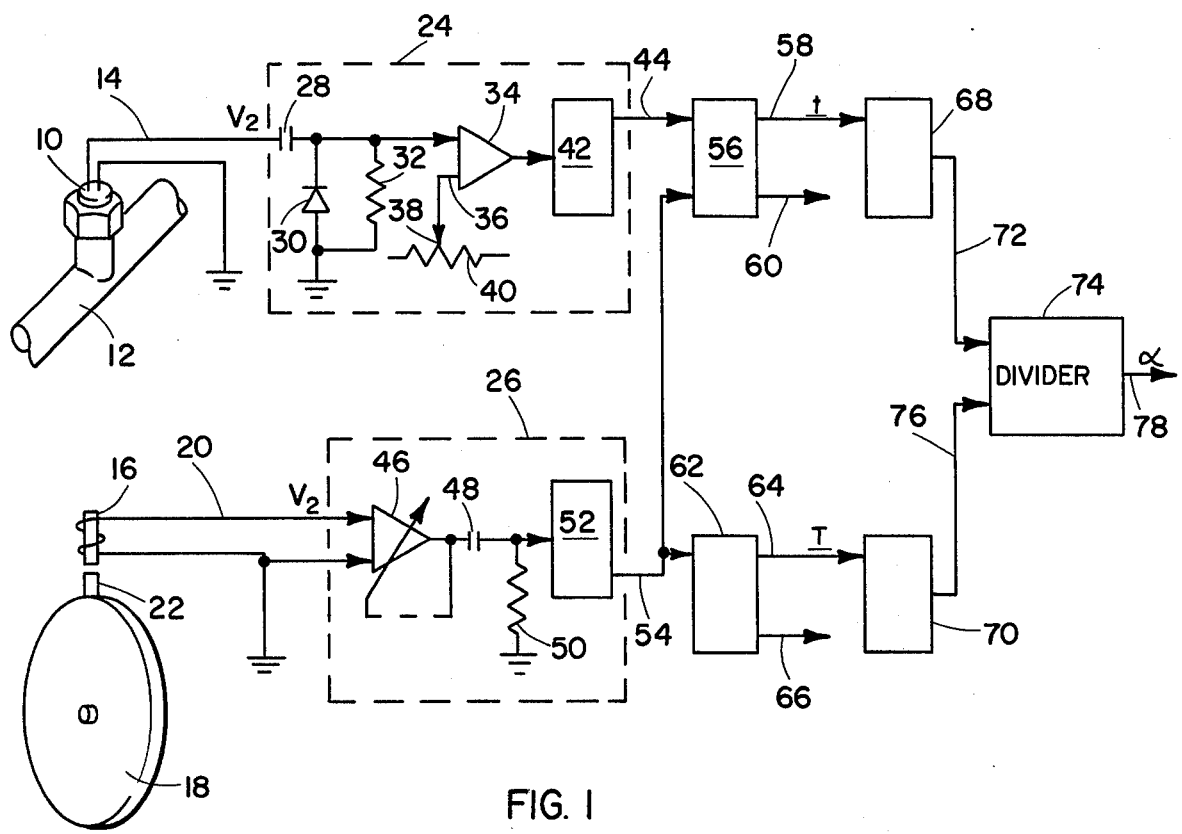
FIG. 1 is a block diagram of a timing advance angle measuring system.

The timing system disclosed herein will be discussed in terms of a diesel engine although it should be understood that the general concepts would equally apply to the measurement of advance angles and speeds of an ignition type engine. As shown in FIG. 1 a pressure transducer 10 is connected to a fuel line 12 and generates a voltage $V_1$ on line 14 proportional to the instantaneous fuel pressure. Thus the voltage $V_1$ on line 14 will increase substantially in response to the increase in fuel pressure necessary to inject fuel into the cylinder. A second sensor is a magnetic pickup 16 which is placed close to the circumference of the engines flywheel 18 and generates a one cycle sine-wave shaped signal $V_2$ on line 20, which crosses the zero axis in the instant when the center of a ferrous tooth 22 or groove on the engine flywheel 18 passes the center line of the pickup 16. Each sensor 10 and 16 is connected to a separate pulse shaping circuit, indicated within the dashed lines 24 and 26, which act as trigger pulse generators that generate square-wave pulses in response to the sensor signals. The first pulse shaping circuit 24 includes a clamping circuit consisting of capacitor 28, diode 30 and resistor 32 which clamps the lower part of the transducer waveform $V_1$ approximately to a normally zero potential so that only a voltage $V_1$ which exceeds the residual level is applied to the first input of a comparator 34. A second input 36 of this comparator is connected to a center arm 38 of a potentiometer 40 which provides an adjustable reference voltage. When the voltage on the first input exceeds the reference voltage, there is an abrupt change in the comparator 34 output which triggers a one-shot multivibrator 42. The square wave pulse triggered on line 44 by multivibrator 4 has a leading edge which coincides with the instant when the fuel pressure exceeds the predetermined level. The second pulse shaping circuit 26 consists of an amplifier 46 which preferably is equipped with automatic gain control and is followed by a differentiating network consisting of capacitor 48 and resistor 50 and by a second one-shot multivibrator 52. The amplifier 46 amplifies the pickup signal $V_2$ on line 20 so that its zero-crossing portion becomes very steep. When this voltage is differentiated the zero crossing portion corresponds to a very narrow and high peaked signal which triggers the second one-shot multivibrator 52, which in turn generates a pulse on line 54 with a leading edge that coincides with the zero-crossing point of the pick-up signal. Since pulses in both circuits 24 and 26 are generated repeatedly as long as the engine is running, they actually produce periodic pulse trains.

Both these pulse trains are fed to a set and a reset input of a flip-flop 56 so that the flip-flop 56 is repeatedly set by leading edges of the first pulse train on line 44 and reset by leading edges of the second pulse train on line 54. Thus the flip-flop 56 output delivers, on complementary output lines 58 and 60, pulses of complementary polarities having a duration equal to the time interval t. At the same time one of the pulse trains, preferably the second one on line 54, is applied to the input of a binary counter 62 which changes its output state upon receipt of each pulse thus delivering complementary pulse outputs on lines 64 and 66 having a duration proportional to the duration of one engine revolution. In the event that the counter 62 is driven by pulses on line 54 which are derived from the pickup signal 20, the duration of output pulses on line 64 and 66 are simply equal to the duration of one engine revolution which we designated at T. In the alternate case where the engine is of the four-cycle type and counter 62 is driven by pulses derived from the pressure signal 14 which are generated every other engine revolution, the duration of output pulses of the counter 62 will be equal to the duration of two engine revolutions.

It is of interest to note that the desired angle information is already included in the first pulse train on line 58 in the form of its average value. It would be, therefore, possible to measure the timing angle by using a low-pass filter (not shown) which would suppress individual pulses and pass only their average value. However, this filter would result in a delay and still leave some ripple on the measured value which would affect the accuracy if a digital display is used. Therefore, the preferred method is described in the following paragraphs which gives more accurate and instantaneous readings.

As explained above, two pulse trains from flip-flop 56 and counter 62 are obtained: the first one 56 having a pulse duration equal to the time interval t and the second one 62 having a pulse duration equal, or at least proportional, to the duration T of one engine revolution. In order to obtain the desired angle $\alpha$ information it is necessary, according to equation (1), to divide the first pulse width on line 58 by the second on line 64 and to use required scaling factor 360. Since both intervals t and T essentially represent time and an electronic circuit can process only electrical quantities, it is necessary to convert these intervals in some proportional electrical quantities. The time intervals t and T are converted into this quantity in converters generally represented by boxes 68 and 70 having outputs proportional to the time intervals. In agreement with equation (1) output of the first converter 68 is connected to a dividend input 72 of a divider circuit 74 while output of the second converter 70 is connected to the divisor input 76. The divider output on line 78 generates a value which, according to equation (1), is equal to the desired timing angle $\alpha$ except for the scaling factor 360. This factor can be accounted for in different ways, according to the kind of applied electrical quantity, as discussed in the following paragraph.

Figure 2:
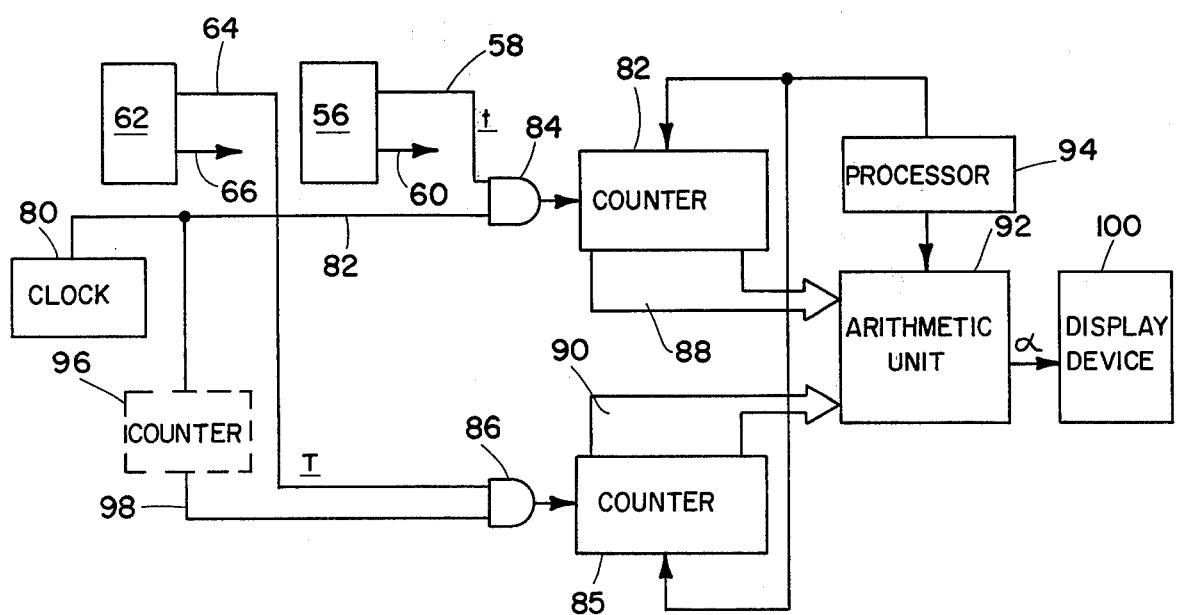
FIG. 2 is a block diagram of a portion of the system of FIG. 1 containing digital circuits for computing advance angle.

There are various suitable quantities which generally can be divided into digital or analog values. FIG. 2 represents an embodiment of the digital type wherein pulses from a clock 80 having a frequency considerably higher than the frequency of the pulses on lines 58 and 64, are fed to the input of a first counter 82, via an AND gate 84, having a second input connected to the output 58 of flip-flop 56, so that AND gate 84 is enabled during the interval t and consequently the counter 82 reaches a certain final reading which, at a given clock frequency, is proportional to the time interval t. The same clock 80 is connected to the input of a second counter 85 via another AND gate 86 having a second input connected to the output 64 of counter 62 and is enabled during the interval T so that the final reading of counter 84 is proportional to the time interval T. These readings are fed as a dividend and divisor over lines 88 and 90 respectively to inputs of an arithmetic unit 92 which is under control of a processor 94 and acts as a digital divider. In order to obtain the correct value of $\alpha$ in degrees it is necessary to use the scaling factor 360 which can be done either by a subsequent digital multiplication, or preferably by a one-to-360 counter indicated by the dashed line 96 on the input line 98 of the counter 84. The processor 94 also controls all other related functions such as repeated resetting of both counters e.t.c. The output of the arithmetic unit 92 representing $\alpha$ can then be applied to either a digital readout display device or an analog meter represented by box 100.

Figure 3:
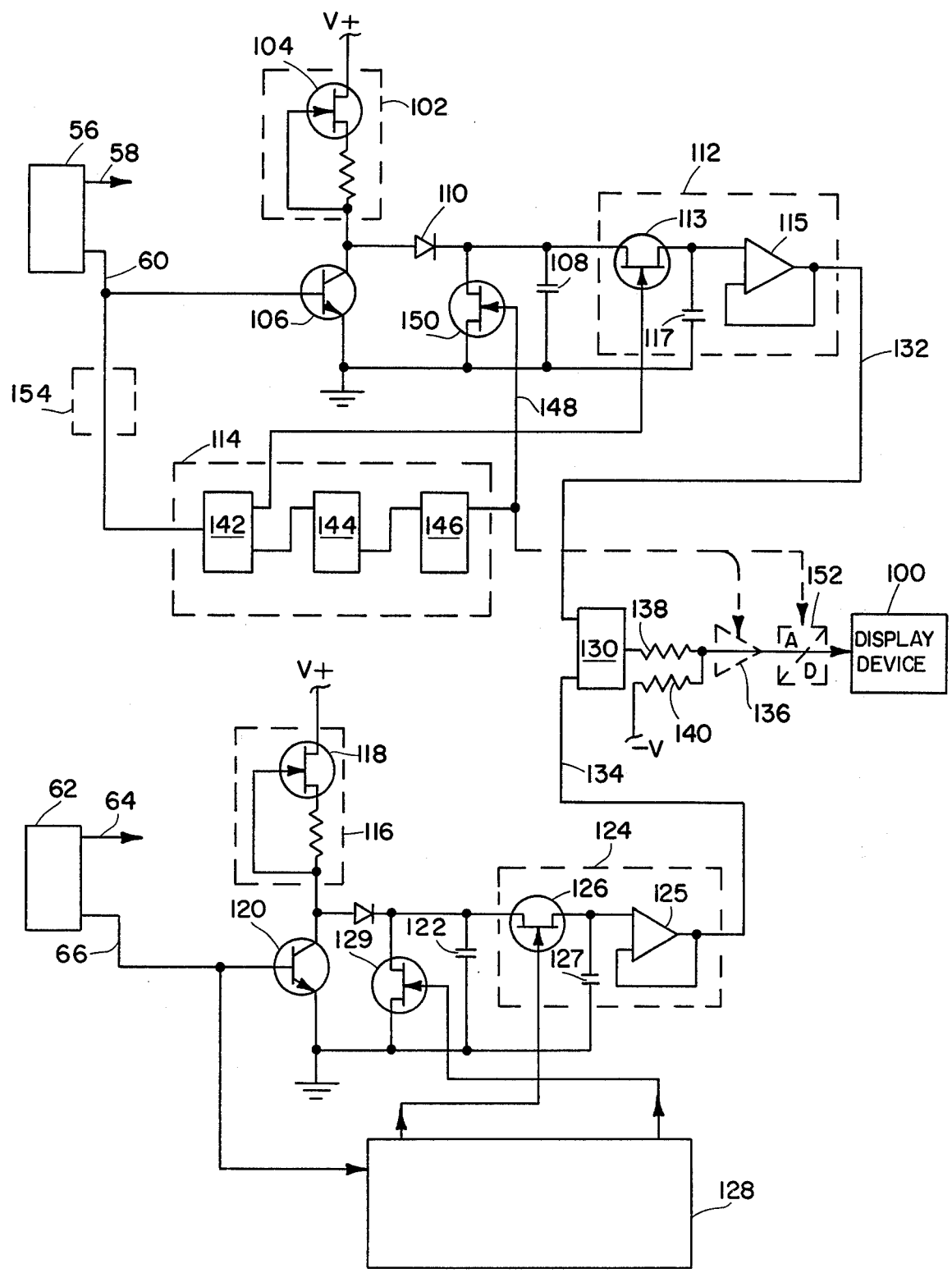
FIG. 3 is a schematic diagram of a portion of the system of FIG. 1 containing analog circuits for computing advance angle.

FIG. 3 illustrates a representative embodiment of the converters 68 and 70 of FIG. 1 of the analog type. A first constant-current source 102 including FET 104 is controlled by a switching transistor 106 having its base connected to the complementary output of 60 of flip-flop 56. As a result, the constant current source 102 will charge a storage capacitor 108 through diode 110 during the interval t. In this way capacitor 108 is charged to a voltage having a final value proportional to the time t; after which its voltage is sampled by a first sample and hold circuit 112 including amplifier 115 and capacitor 117, and then discharged by a FET switch 150. Both the sampling function and the discharging are controlled by a sequencing circuit 114 which will be described later.

In a similar manner a second constant-current source 116 including a FET 118 is controlled by transistor 120 having its base connected to the output 66 of the counter 62, serves to charge a second storage capacitor 122 during the time interval T. The final voltage of the capacitor 122 is then sampled by a second sample and hold circuit 124 including amplifier 125 and capacitor 127 and then discharged by a second FET switch 129. These functions are controlled by a second sequencing circuit 128. Outputs of both sample and hold circuits 112 and 124 are connected to the dividend and divisor inputs of an analog divider 130 by lines 132 and 134 wherein the output of circuit 130 represents the angle $\alpha$. The 360 scaling factor can be accounted for either by an attenuating or amplifying device on the divider output represented by the amplifier in dashed lines 136 or preferably by a suitable choice of values of both charging currents and/or storage capacitors 108 and 122.

In some cases it may not be possible to locate the magnetic pickup 16 of FIG. 1 exactly in the top dead center position so that it is offset a predetermined angle after TDC. The previously described circuitry would then display a timing angle which is, by this basic angular difference, larger than the correct timing angle and consequently requires a subtraction of the offset angle. This is easily compensated for both in the digital or analog embodiments of FIG. 2 and 3. In the digital version of FIG. 2 it is only necessary to program the arithmetic unit 92 to subtract the offset angle and display the remainder. In the analog version of FIG. 3 a summing network consisting of resistors 138 and 140, passive or preferably active, can be used on the divider output. One input of resistor 138 is connected to the divider 130 output while the other resistor 140 is connected to a correcting DC voltage -V of an opposite polarity. In this way the offset angle is subtracted and only the correct timing angle is displayed in the display device 100.

In actual operation the pressure waveform on line 14 of FIG. 1 usually varies slightly from stroke to stroke so that the position of the starting point varies and the resulting angle is consequently slightly different for each cycle. It is possible to obtain either a separate different for each cycle or an average reading over a certain number of cycles. Both these cases will be explained below in connection with the analog embodiment of FIG. 3.

The sequencing circuit 114 in FIG. 3 consists of several cascaded one-shot multivibrators, preferably of three one-shots 142, 144 and 146. The first one-shot multivibrator 142 is triggered by the trailing edge of the charging pulse on line 60 and generates a sampling pulse for the first sample and hold circuit 112. The trailing edge of this pulse triggers the second one-shot multivibrator 144, which is used merely for generating a space between the end of the sampling period and the beginning of the discharging process of the storage capacitor 108. At the end of this space, the third one-shot multivibrator 146 is triggered and generates a pulse on line 148 which turns on a discharging FET 150. This pulse starts, therefore, when the sample and hold circuit 112 already has the correct signal and will end before the arrival of the next charging pulse; therefore, it has a suitable time position for providing separate readings of individual cycles. The details of sequencing circuit 128 are not shown, however, it can operate in the same manner as seqencing circuit 114 in controlling FETs 126 and 129 of the sample and hold circuit 124.

In the event that a separate reading in analog format is desired, this pulse can be used as strobing pulse e.g. in an output buffer stage 136 connected to line 148. In the event that a reading in digital format is desired, an analog-to-digital converter 152 is used in the output portion of the measuring system of FIG. 3; in this case the pulse on line 148 is used as conversion command which starts the conversion process in synchronism with individual fuel injections so that separate readings for each cycle are obtained.

In case an average reading over a certain number of cycles is required, the sequencing circuit 114 can be adapted in the following manner: a digital counter shown by dashed lines 154 divides the number of incoming pulses in the required ratio. If, for example, an average reading over ten cycles is to be obtained, counter 154 will be a decade counter driven by trailing edges of the incoming charging pulses on line 66 and will trigger after ten pulses one-shot multivibrator 142. As a result the storage capacitor 108 is successively charged during ten subsequent cycles and its final voltage is then sampled by the sample and hold circuit 112 and discharged by the FET switch 150 after ten charging cycles. In order to obtain a reading which is equal to an average individual reading, it is necessary either to decrease, by a factor ten, the value of the charging current from 102, or to increase by the same factor the value of the storage capacitor 108, or to change both these values, e.g. to increase capacitance five times and decrease current to one half. In this way the capacitor is charged in a stepwise manner during ten cycles to a final value which represents the average value of all ten cycles. This value is then sampled and processed in the divider 130, instead of the original individual values.

Figure 4:
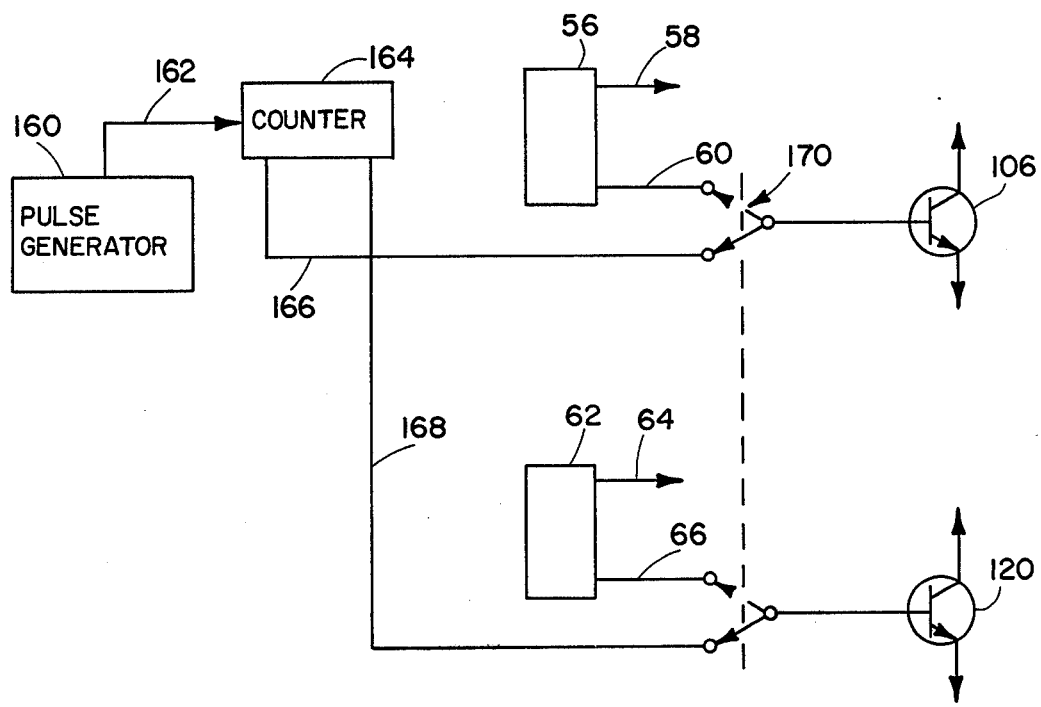
FIG. 4 is a schematic diagram of a first advance angle calibration circuit.

Since the charging current and the capacitor value can vary slightly as a result of aging and temperature variations, it is often required to have an internal calibrating source which can simulate a predetermined angle $a$, preferably one which corresponds to a full-scale output, which usually is in the vicinity of 40 to 50 degrees. According to the present invention this is achieved as shown in FIG. 4. An auxiliary pulse generator 160 generates a train of narrow, equally spaced pulses on line 162 connected to the input of a counter 164 which in turn generates output pulses having a width equal to a multiple of the repetition period of incoming pulses. If the counter 164 consists of four cascaded binary counters, its first output delivers on line 166 pulses whose width is equal to one repetition period while its fourth output on line 168 delivers pulses whose width equals eight periods. Upon depression of a calibration switch 170 the base of the transistor 106 which controls the charging process of capacitor 108 in FIG. 3 is disconnected from flip-flop 56 and connected to the first output 166 of the counter 164. At the same time the base of the second control transistor 120 is disconnected from the binary counter 62 and connected to the other output 168 of the calibrating counter 164. In this way pulses which control the charging process of the first storage capacitor 108 have a duration which is exactly one eighth of the duration of pulses which control charging of the second capacitor 122 of FIG. 3. This, according to equation (1), corresponds to an angle 45 degrees.

Figure 5:
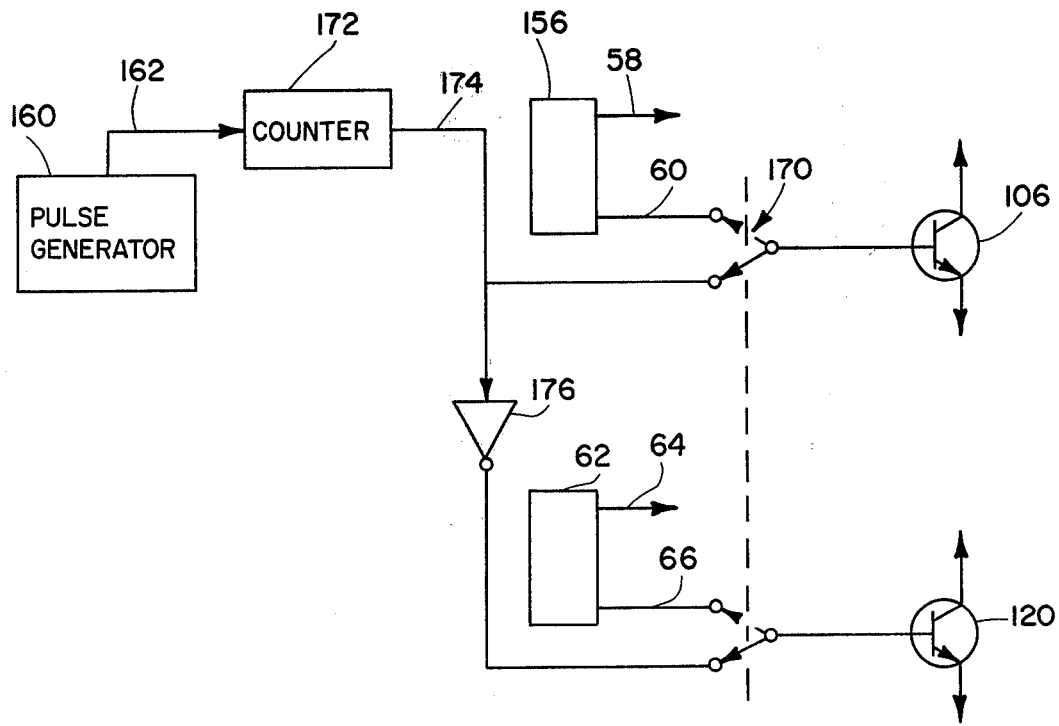
FIG. 5 is a schematic diagram of a second advance angle calibration circuit.

The function with an octal counter 164 was explained only as an example; a more convenient application of the same basic idea as illustrated in FIG. 5 contains a decade counter 172 that delivers pulses on line 174 with a width equal to one repetition period of incoming pulses while spacing between pulses equals nine of these periods. These pulses are then connected to the base of the first control transistor 106 while the second control transistor 120 receives the same pulses only with polarity inverted in an inverter 176. In this way a calibrating angle of 40 degrees is simulated.

Figure 6:
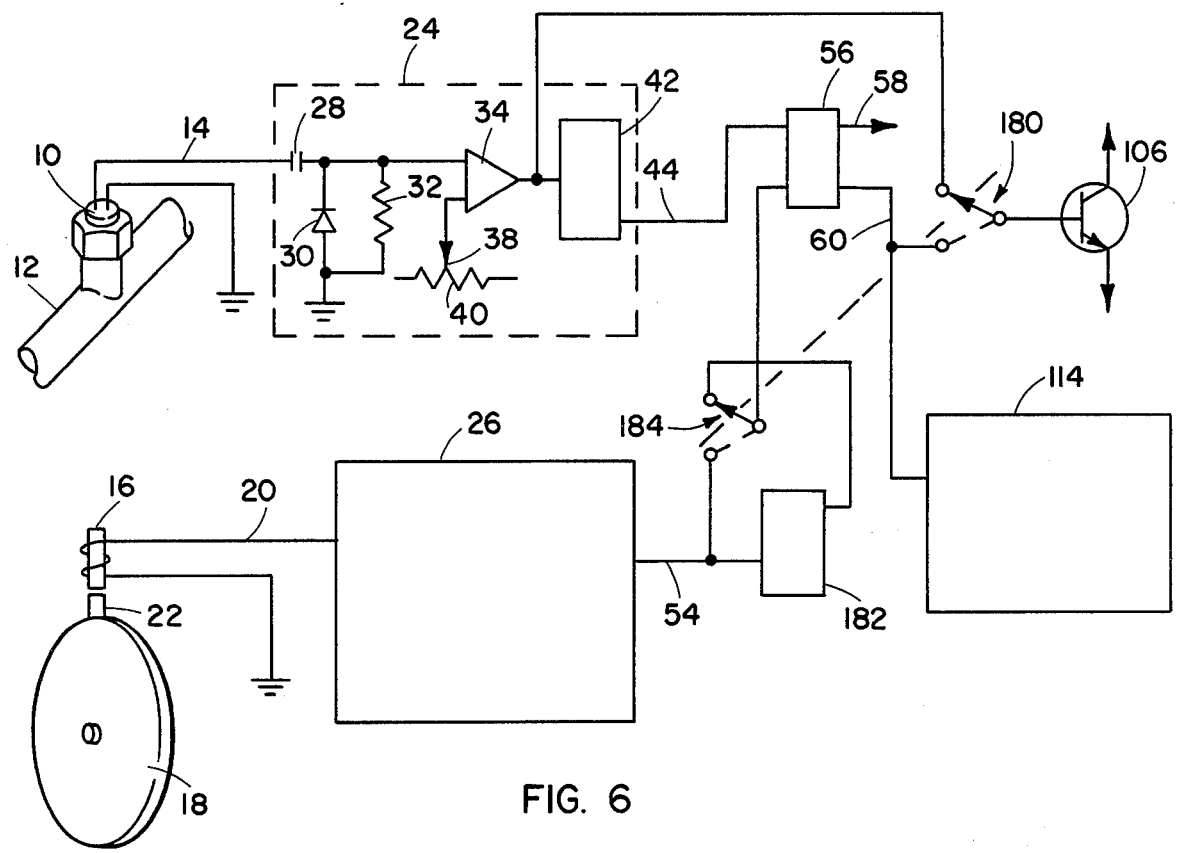
FIG. 6 is a block diagram of a circuit for measuring injection duration.

The second parameter, measurement of which is sometimes required, is the injection duration angle, i.e. the angle during which the fuel pressure is higher than a predetermined level. Since the pressure waveform in transducer may have several peaks due to reflections, it can intersect the reference level several times, so the injection angle may consist of several separate sections. In order to measure this angle only, some minor changes in the previously described circuit are necessary which will be explained in conjunction with FIG. 6.

The output of the comparator 34 in which the pressure waveform is changed into a corresponding square-wave with its width equaling the time interval, or several intervals, during which the pressure is higher than a predetermined level is connected, by means of contacts of a switch 180 to the base of the first control transistor 106 of FIG. 3 and disconnected from the corresponding flip-flop 56. The input on line 60 of the sequencing circuit 114 of FIG. 3 which controls the sampling and discharging process remains connected to the output of the flip-flop 56. It would be possible to leave the reset input on line 54 of flip-flop 56 connected with the output of the second pulse shaper 26 but, in this case, only an injection duration shorter or equal to the timing angle could be measured which, in case of a small timing angle, would be insufficient. Therefore, an additional oneshot multivibrator 182 is preferably included in the reset path by means of another contact set 184 of the switch 180. This results in a certain delay in resetting of flip-flop 56 and in triggering of the sequencing circuit 114. This delay, of course, can have only a limited duration since the discharging process of capacitor 108 must be finished before the arrival of the next injection pulse. The same arrangement for measurement of individual angles or average angles, which was described in previous paragraphs, can also be used for the injection duration.

The portion of the disclosed system which is used for measuring the engine speed in revolutions per minute (RPM) will be discussed next. In the digital embodiment of FIG. 2 the number of clock pulses counted during one engine revolution by counter 85 can be defined as $n_2$; so it is only necessary to compute the value $$RPM = 60 \, n_2/f_{cl} \qquad (2)$$

where $f_{cl}$ is frequency of the clock 80. This division and multiplication by a scaling factor can be accomplished in the same way as was explained in connection with the timing angle measurement, preferably using the same arithmetic 92 and processing 94 units.

Figure 7:
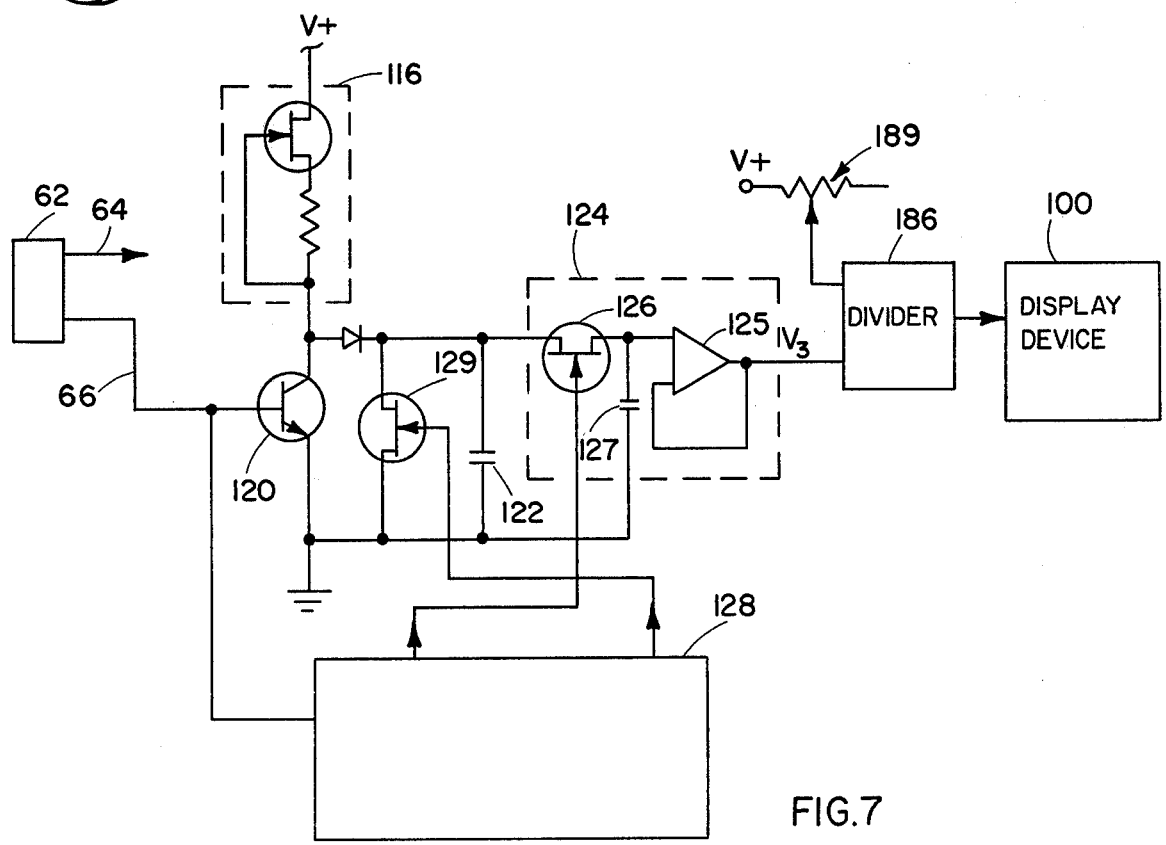
FIG. 7 is a block diagram of a circuit for measuring engine speed.

In the analog embodiment FIG. 7, a voltage $V_3$ is equal to kT (where k is a proportionality factor) of the second sample and hold circuit which in turn is proportional to the duration T of one revolution. In order to obtain a measure of the engine speed the value must be generated:

$$RPM = T/60 = v_3/60k \qquad (3)$$

This requires the division of a reference voltage, $V_4$, which represents the scaling factor 60k, by the output voltage $V_3$ of the second sample and hold circuit 124. This is accomplished in an analog divider 186 which has as a dividend input on line 188 the reference DC voltage $V_4$ from the resistive divider 189 and a divisor input from the second sample and hold circuit 124. The divider 186 then provides the display device 100 with a signal representing engine speed. The advantage of this measurement, as compared with the usual counting method, is the fact that the speed is shown immediately, without waiting for the counting interval to elapse. It is apparent that the divider 130 of FIG. 3, which provides the angle α measurement, can be used for the speed measurement since only one of its inputs needs to be switched to another point. For checking the accuracy of speed measurement a calibrating circuit based on a comparison with 60 Hz power line frequency can be used. Since such calibration is well-known and used e.g. for calibrating LF oscillators, this operation will not be described.

Figure 8:
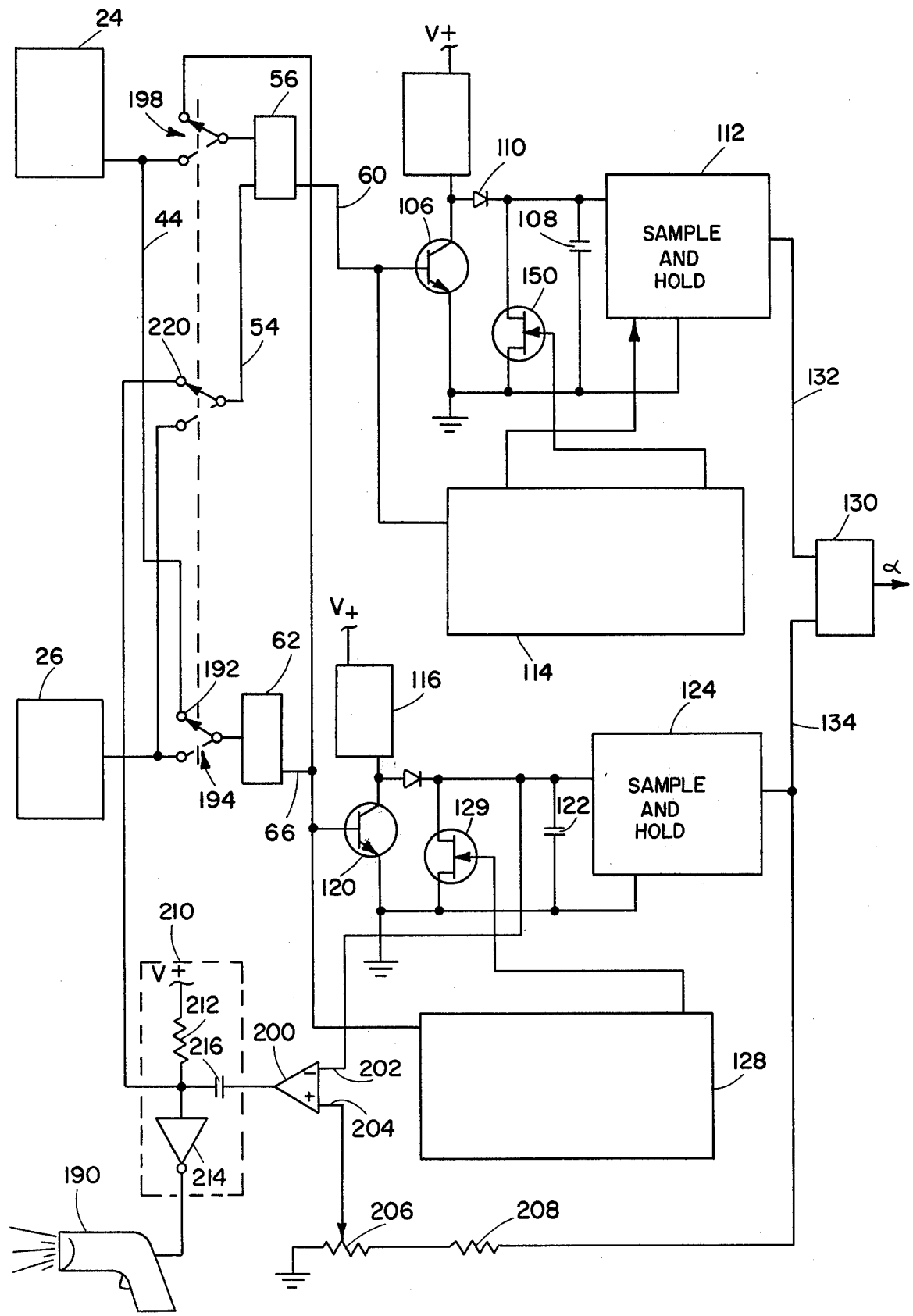
FIG. 8 is a block diagram of a circuit using a strobe light.

It is sometimes required to measure the timing angle of diesel engines which have no provision for accommodating magnetic pickup nor a tooth or groove on the flywheel 18 of FIG. 1, but only a timing pointer which coincides with a marker on the engine body when the piston of the first cylinder is in its top dead center position. According to the present invention the arrangement which has been described in the preceding paragraphs can be adapted to work with a strobe light that replaces the magnetic pickup. To use a strobe light for timing a diesel engine is, of course, a very well known procedure but the present invention can be adapted to use a strobe light in a manner that permits cooperation with the rest of the described circuitry. An illustration of the modifications required is provided in FIG. 8. The adjustment of the time delay for a strobe light 190 is done in the conventional way, i.e., by setting adjusting knob the strobe flash so that the pointer lines up with the TDC marker. When the time delay has been adjusted to a particular engine speed, it is no longer necessary to readjust it when the speed is changed since the delay will be changed automatically in response to changes in the engine speed.

Since no magnetic pickup is used, no pulses are coming from the output of the pulse shaper 26, so the input of the binary counter 62 must be disconnected by means of contacts 192 of a switch 194 from the pulse shaper 26 of FIG. 1 and connected to the output 44 of pulse shaper 24 which is driven by pulses of the pressure transducer 10 of FIG. 1. This results in the circuit, including elements 116, 120, 122, 124 and 128 operating in a similar manner as described in connection with FIG. 3.

Another contact set 198 of the switch 194 serves to disconnect input of the flip-flop 56 from the pulse shaper 24 and to connect it to the output 66 of the binary counter 62 so that flip-flop 56 is now driven by every other pressure pulse. When the incoming pulse on line 44 changes the output 66 of counter 62 so that it drops to zero, capacitor 122 starts charging until the arrival of the next pulse. In a similar way, capacitor 108 starts charging but, since there is now no pulse from the magnetic pickup 16 which would come to the reset input 54 and stop the charging process, some other means must be used for this function. This means consist of a comparator 200 having as a first input 202 connected to the storage capacitor 122 and a second input 204 connected to the center arm of a potentiometer 206 which in turn is connected, preferably via an additional resistor 208, across the output 134 of the corresponding sample and hold circuit 128.

Since, at a given engine speed, the output of the sample and hold circuit 128 has a certain steady DC voltage, the second comparator input 204 has a certain DC voltage while the first input 202 follows the voltage ramp of the storage capacitor 122. At a certain instant the ramp voltage exceeds the steady voltage on the second input 204 and results in an abrupt change of the comparator 200 output voltage. This change is fed to the following pulse shaper 210, comprising resistor 212, inverter 214, and capacitor 216, which derives from it a pulse for resetting, via a contact 220 of switch 194, the flip-flop 56 and a triggering pulse for the strobe light 190. This pulse shaper can be made in various ways: it can consist e.g. of a differentiator 212 and 216 which supplies directly the reset pulse via contacts 220 and is connected also to the input of the inverting gate 214, which generates trigger pulse for the strobe light 190. Another possibility is to use an additional one-shot multivibrator (not shown) having complementary outputs that would deliver both pulses.

Since the sample and hold circuit 124 has an output voltage which corresponds to two revolutions, i.e. to 720 degrees, it is necessary, in the event that the timing angle is e.g. 45 degrees, in order to trigger the light in a correct instant, to the second comparator input with a part of the sample and hold output which corresponds to 720/45 or 1/16 of its output voltage taken from potentiometer 206. If the engine speed is changed, e.g. increased, then both the capacitor voltage and the sample and hold output voltage will decrease in the same ratio, so that the potentiometer 45 should remain adjusted to 1/16 of the full output. This demonstrates that once the potentiometer is correctly adjusted for a certain angle, it need not be readjusted when the engine speed is changed because the circuit automatically maintains a constant angular delay. Since the flip-flop 56 is receiving a reset pulses from the output of the pulse shaper 210, the remainder of the system works as previously described and delivers an output voltage on line 134 which is then processed by the divider 130 and defines the angle α.

It is to be understood that the preceding description concerns only a typical embodiment of the invention and that various alterations are possible without departing from the scope of the invention. Particularly it should be understood that instead of the tooth or groove on the engine flywheel any intentionally arranged magnetic irregularity on the flywheel can be used for generating a signal in the magnetic pickup, that instead of the flywheel any other rotating part which is driven by the engine, can be used and that individual electronic units can be replaced by units of another type as long as their function remains the the same. In addition, even though the invention was discussed in terms of a diesel engine where the timing angle was defined as the angle between a fuel injection pulse and when the piston reached top dead center, the disclosed instrument would be equally useful in timing internal combustion engines using electrical ignition. For example the point where a spark is applied to the cylinder can be considered functionally equivalent to the fuel injection point for timing purposes wherein they both can be considered a firing event. Also it should be understood that the magnetic pickup unit 16 of FIG. 1 could be replaced by another type of pickup, e.g. by an electro-optical device for indicating the relative position of the flywheel 18.

The basic idea of this invention includes also cases in which the pressure pulse is started at some other point than in the instant when the pressure exceeds a predetermined level, e.g. in the instant when the pressure reached its peak value or when it dropped below a predetermined level.

We claim:

1. An electronic test instrument for a rotating, piston driven internal combustion engine comprising:
   means for generating a signal representing the time of occurrence of a firing event in the engine;
   means for generating a position signal representing the time a predetermined piston in the engine arrives at a predetermined point within a cylinder;
   means responsive to said firing event signal and said position signal for generating a t pulse signal wherein said t pulse signal has a pulse width proportional to t the time duration from said firing event to the time said piston reaches said predetermined point within the cylinder;
   means for generating a T pulse signal wherein said T pulse signal has a pulse width proportional to T the time of rotation of the engine;
   first means for converting said t signal pulse width into a first electrical quantity representing t;
   second means for converting said T signal pulse width into a second electrical quantity representing T; and
   electronic means for dividing said first electrical quantity by said second electrical quantity to generate a timing angle signal.

2. The instrument of claim 1 additionally including means for dividing a predetermined reference constant by said second electrical quantity to generate a signal representing the rate of engine rotation.

3. The instrument of claim 1 wherein said position signal indicates the time that said piston reaches the top dead center position in the cylinder.

4. The instrument of claim 1 wherein said T signal generating means includes a counter responsive to said position signal and wherein said T signal pulse width is proportional to the time duration of one engine revolution.

5. The instrument of claim 4 wherein
   said first electrical quantity produced by said first converting means is a t digital signal;
   said second electrical quantity produced by said second converting means is a T digital signal; and
   said dividing means includes a digital arithmetic unit operatively responsive to said t digital signal and said T digital signal for dividing said t digital by said T digital signal to obtain said timing angle signal.

6. The instrument of claim 4 additionally including a clock signal generator; and wherein
   said first converting means includes a counter responsive to said clock and said t signal pulse width for generating said t digital signal; and
   said second converting means includes a counter responsive to said clock and said T signal pulse width for generating said T digital signal.

7. The instrument of claim 1 wherein
   said first electrical quantity produced by said first converting means is a t voltage;
   said second electrical quantity produced by said second converting means is a T voltage; and
   said dividing means includes a voltage divider circuit responsive to said t voltage and said T voltage for generating a voltage equal to said timing angle.

8. The instrument of claim 1 additionally including means responsive to said firing event signal for measuring the duration angle of said firing event.

9. The instrument of claim 8 wherein said means for measuring said firing event duration angle includes:
   means for generating a signal representing the time duration of said firing event;
   means for applying said time duration signal to said electronic dividing means for dividing said time duration signal by said second electrical quantity.

10. The instrument of claim 9 wherein said means for measuring said firing event duration angle includes:
    switch means for switching the input of said electronic dividing means from said first electrical quantity to said time duration of said firing event signal.

11. The instrument of claim 1 additionally including a calibration circuit including:
    a pulse generator;
    a multistage counter operatively connected to said pulse generator;

means for connecting a first output from said multistage counter to said t pulse signal generating means resulting in said t pulse width representing a first predetermined time duration; and means for connecting a second output from said multistage counter to said T pulse signal generating means resulting in said T pulse width representing a second predetermined time duration greater than said first predetermined time duration.

12. The instrument of claim 1 additionally including a calibration circuit including:

a pulse generator;

a counter operatively connected to said pulse generator for generating an output pulse signal whose width is a fixed fraction of its period;

means for connecting said counter output pulse signal to said t pulse signal generating means resulting in said t pulse width representing a first predetermined time duration; and means, including a signal inverter, for connecting said counter output pulse signal to said T pulse signal generating means resulting in said T pulse width representing a second predetermined time duration greater than said first predetermined time duration.

13. The instrument of claim 1 additionally including:

means for selectively disconnecting said t pulse signal generating means from said position signal generating means;

means, operatively connected to said selective disconnecting means and said t pulse signal generating means, for generating said t pulse signal;

means for selectively connecting said T pulse signal generating means to said firing event signal generating means to generate said T pulse signal; and means connected to said T pulse signal generating means for generating a strobe light trigger signal.

14. An electronic test instrument for a rotating piston driven internal combustion engine comprising:

a first pulse shaping circuit for generating a pulse signal representing the time of occurrence of a firing event in the engine;

a second pulse shaping circuit for generating a pulse signal representing the time a predetermined point on a rotational part of the engine passes a predetermined point on the engine housing;

a t signal generating circuit, operatively connected to said first pulse shaping circuit and said second pulse shaping circuit, for generating a t pulse signal having a pulse width equal to the time interval t from said firing event to the time the flywheel passes said predetermined point;

a T signal generating circuit for generating a T pulse signal having a pulse width equal to the duration T of one engine revolution;

a first voltage converter circuit operatively connected to said t signal generating circuit for converting said t pulse width into a voltage representing t;

a second voltage converter circuit operatively connected to said T signal generating circuit for converting said T pulse width into a voltage representing T;

a divider circuit operatively connected to said first and second converter circuits for generating a signal equal to a timing angle signal $\alpha$; and a display device operatively connected to said divider circuit for displaying said $\alpha$ signal.

15. The instrument of claim 14 wherein said divider circuit includes a constant voltage source for generating a constant voltage signal and a circuit to divide said constant voltage by said T voltage to generate a speed signal.

16. The instrument of claim 14 additionally including means operatively connected to said first pulse shaping circuit and said first voltage converter circuit for generating a voltage representing the time duration of said firing event and means including said divider circuit for dividing said firing event duration voltage by said T voltage to generate a firing event angle signal.

17. The instrument of claim 14 additionally including a calibrating circuit comprising:

a pulse generator circuit;

a multistage counter operatively connected to said pulse generator circuit;

a circuit connecting one output of said multistage counter to said first pulse duration-to-voltage converter circuit; and a circuit connecting another output of said multistage counter to said second pulse duration-to-voltage converter resulting in said divider circuit generating a predetermined signal.

18. The instrument of claim 14 additionally including a calibrating circuit comprising:

a pulse generator circuit;

a counter operatively connected to said pulse generator;

a circuit connecting the output of said counter to said first pulse duration-to-voltage converter circuit; and an inverter circuit connecting the output of said counter to said second pulse duration-to-voltage converter circuit resulting in said divider circuit generating a predetermined signal.

19. The instrument of claim 14 additionally including means for triggering a strobe light with a delay proportional to an adjustable fraction of one revolution independent of speed including:

a circuit operatively connecting said T signal generating circuit to said first pulse generating circuit;

a circuit operatively connecting said t signal generating circuit to said T signal generating circuit;

a voltage comparator circuit operatively connected to said second voltage converter circuit;

a circuit connecting the output of said voltage comparator circuit to said t signal generating circuit; and a strobe lamp triggering circuit operatively connected to the output of said voltage comparator circuit.

20. The test instrument of claim 14 wherein said first pulse shaping circuit includes:

a comparator circuit responsive to said firing event; and a one shot multivibrator operatively connected to said comparator for generating said pulse signal representing the firing event.

21. The instrument of claim 14 wherein said second pulse shaping circuit includes:

an amplifier for amplifying a signal representing said time the point on the rotating part of engine passes said predetermined point;

a differentiating circuit operatively connected to said amplifier; and a one shot multivibrator operatively connected to said differentiating circuit for generating said pulse signal representing the point in time the flywheel passes said point on the engine housing.

22. The instrument of claim 14 wherein t signal generating circuit includes a flip-flop having a set terminal connected to said first pulse shaping circuit and a reset terminal connected to said second pulse shaping circuit.

23. The instrument of claim 22 wherein said T signal generating circuit includes a binary counter operatively connected to said second pulse shaping network.

24. The instrument of claim 14 wherein said first voltage converter circuit includes:
   a constant current source;
   a storage capacitor;
   a switching transistor operatively connected to said constant current source and said storage capacitor and responsive to said t signal;
   a sample and hold circuit operatively connected between said storage capacitor and said divider circuit; and
   a sequencing circuit operatively connected to said t signal generating circuit and said storage capacitor.

25. The instrument of claim 24 wherein said first voltage converter includes transistor means connected between said storage capacitor and said sequencing circuit for discharging said storage capacitor.

26. The instrument of claim 25 wherein said sample and hold circuit includes:
   a sampling capacitor; and
   a switching transistor means operatively connected between said storage capacitor and said sampling capacitor and responsive to said sequencing circuit for charging said sampling capacitor to peak valve of voltage in storage capacitor.

27. The instrument of claim 26 wherein said sequencing circuit includes a plurality of cascaded one-shot multivibrators wherein the first multivibrator is triggered by said t signal and the output of the last multivibrator is connected to said transistor means for discharging said storage capacitor.

28. The instrument of claim 14 wherein said second voltage converter circuit includes:
   a constant current source;
   a storage capacitor;
   a switching transistor operatively connected to said constant current source and said storage capacitor and responsive to said T signal;
   a sample and hold circuit operatively connected between said storage capacitor and said divider circuit; and
   a sequencing circuit operatively connected to said T signal generating circuit and said storage capacitor.

29. The instrument of claim 28 wherein said first voltage converter includes transistor means connected between said storage capacitor and said sequencing circuit for discharging said storage capacitor.

30. The instrument of claim 29 wherein said sample and hold circuit includes:
   a sampling capacitor; and
   a switching transistor means operatively connected between said storage capacitor and said sampling capacitor and responsive to said sequencing circuit for charging said sampling capacitor to peak valve of voltage in storage capacitor.

31. The instrument of claim 30 wherein said sequencing circuit includes a plurality of cascaded one-shot multivibrators wherein the first multivibrator is triggered by said T signal and the output of the last multivibrator is connected to said transistor means for discharging said storage capacitor.

32. Apparatus for measuring the timing angle of a diesel engine having an injector fuel line and a flywheel comprising:
   a pressure transducer connected to the injector fuel line of the engine;
   a pickup element secured to a rotating part of the engine;
   a magnetic pickup located in close proximity to the circumference of the rotating part of the engine in a predetermined position with respect to a top dead center position of a selected piston;
   first pulse shaper connected to said pressure transducer for generating output pulse with leading edges appearing at the instant when fuel pressure in the fuel line exceeds a predetermined level;
   second pulse shaper connected to said magnetic pickup for generating output pulses with leading edges appearing at the instant when said pickup element passes said predetermined position;
   a flip-flop having a set input connected to the output of said first pulse shaper, and a reset input connected to the output of said second pulse shaper for generating output pulses having a duration equal to the time interval between said leading edge of the output pulses of said first pulse shaper to said leading edge of the output pulses of said second pulse shaper;
   a binary counter receiving as input the output of one of said pulse shapers for generating output pulses having a duration in a known fixed relation to the duration of one engine revolution;
   a first time-to-an-electrical-quantity converter operatively connected to said flip-flop for generating a signal proportional to the duration between said instant the fuel pressure exceeds said predetermined pressure and said pickup element passes said predetermined position;
   a second time-to-an-electrical-quantity converter for generating a signal proportional to the time of one revolution of the engine; and
   a divider having a dividend input connected to said first converter and having a divisor input connected to said second converter, generating an input signal proportional to the angle between the position of said pickup element in the instant when the fuel pressure exceeds said predetermined level and said predetermined position with respect to top dead center.

33. The apparatus of claim 32 wherein said first time-to-an-electrical-quantity converter includes a first digital counter;
   a clock generator;
   a first AND gate operatively interposed between said first digital counter and said clock generator, and operatively controlled by said flip-flop output pulses such that said first counter products a digital signal proportional to the duration of said flip-flop output pulses;
   said second time-to-an-electrical-quantity converter includes:
   a second digital counter operatively connected to said clock generator and a second AND gate interposed between said second counter and said clock and controlled by output pulses of said binary counter such that said second counter produces a digital signal proportional to the duration of said binary counter output pulses; and said divider is a digital arithmetic unit programmed to function as a divider having a dividend input connected to the output of the first counter a divisor input connected to the output of the second counter.

34. The apparatus of claim 33 wherein said arithmetic unit is programmed to subtract a predetermined value from said divider output;

35. The apparatus of claim 33 additionally including an arrangement for measuring the engine speed, in which said arithmetic unit is programmed to perform, in time sequence with the division required for determining the timing angle, a division of a reference number by the output value of said second counter.

36. The apparatus of claim 37 wherein said first time-to-an-electrical-quantity converter includes:
 a first constant-current source;
 a first switching transistor operatively connected to said flip-flop;
 a first storage capacitor operatively connected to said first current source by means of said first switching transistor; and
 a first sample and hold circuit operatively connected to said first capacitor.

37. The apparatus of claim 36 wherein said second time-to-an-electrical-quantity converter includes a second constant-current source responsive to said binary counter means; a second switching transistor for charging a second storage capacitor and a second sample and hold circuit operatively connected to said second constant-current source.

38. The apparatus of claim 37 additionally including a counter, operably connected to said flip-flop output and having an output connected to an input of a first sequencing circuit in order to control said sampling and discharging process of said first storage capacitor.

39. The apparatus of claim 37 additionally including an auxiliary pulse generator connected to the input of a multistage counter having an output connected to an input of said first switching transistor for charging of said first storage capacitor and another output connected to said second switching transistor for controlling the charging of said second storage capacitor.

40. The apparatus of claim 37 additionally including an auxiliary pulse generator connected to the input of a decade counter having an output connected to an input of said first switching transistor and a second output connected by means of a polarity inverter to an input of said second switching transistor for controlling the charging of said second storage capacitor.

41. The apparatus of claim 37 additionally including an arrangement for measuring the injection duration angle, comprising a switch for selectively disconnecting said first switching transistor from the output of said flip-flop and connecting it to an output of said first pulses shaper.

42. The apparatus of claim 41 additionally including means for connecting said reset input of said flip-flop to the output of said second pulse shaper.

43. The apparatus of claim 37 wherein said divider is an analog divider having a dividend input connected to said first sample and hold circuit and a divisor input connected to said second sample and hold circuit.

44. The apparatus of claim 43 which an adjustable DC voltage is added to said divider output by means of a summing network.

45. The apparatus of claim 43 additionally including an analog-to-digital converter connected to said divider output.

46. The apparatus of claim 43 additionally including an arrangement for measuring the engine speed, in which said dividend input of said analog divider is connected to a reference DC voltage and said divisor input is connected to the output of said second sample and hold circuit generating at the divider output a voltage which is a predetermined ratio to the engine speed.

47. The apparatus of claim 46 wherein said analog divider is used for measuring both timing angle and engine speed, wherein said divisor input is connected to the output of said second sample and hold circuit and said dividend input is selectively switchable either to the output of said first sample and hold circuit or to a reference DC voltage.

48. The apparatus of claim 43 additionally including a circuit for triggering a strobe light comprising:
 a switch for selectively disconnecting the input of said binary counter from said second pulse shaper and connecting it to the output of said first pulse shaper;
 for disconnecting the set input of said flip-flop from said first pulse shaper and connecting it to the output of said binary counter; and
 for disconnecting the reset input of said flip-flop from the output of said second pulse shaper and connecting it to the output of an additional pulse shaper, said additional pulse shaper connected to an output of an additional comparator with a first input of said pulse shaper connected to said second storage capacitor and a second input connected to the output of said second sample and hold circuit, thereby being effective to generate a strobe light trigger signal with a delay proportional to an adjustable fraction of the duration of one revolution.

49. The apparatus of claim 32 wherein an electrical quantity is subtracted from the output value of said divider in order to compensate for an angle between the actual angular position said magnetic pickup and the top dead center position.

50. An electronic test instrument for a rotating, piston driven internal combustion engine comprising:
 a first pulse shaping circuit for generating a pulse signal representing the time of occurrence of a firing event in the engine;
 a second pulse shaping circuit for generating a pulse signal representing the time a predetermined point on the rotating part of the engine passes a predetermined point on the engine housing;
 a t signal generating circuit, operatively connected to said first pulse shaping circuit and said second pulse shaping circuit, for generating a t signal pulse train having pulse widths equal to the time interval t from said firing event to the time said rotating part of the engine passes said predetermined point;
 a T signal generating circuit for generating a T signal pulse train having pulse widths equal to the duration T of one engine revolution;
 a clock pulse generator;
 a first counter operatively connected to said clock and said t signal generator circuit for generating a digital signal representing said t pulse widths;
 a second counter operatively connected to said clock and said T signal generator circuit for generating a digital signal representing said T pulse widths; and an arithmetic unit operatively connected to said first and second counters for dividing said t digital signal by said T digital signal, thereby generating an α signal representing display means operatively connected to said arithmetic unit for displaying said α angle.

51. The instrument of claim 50 additionally including a first AND gate having one input connected to said t signal generating circuit, another input connected to said clock and an output connected to said first counter; and a second AND gate having one input connected to said T signal generating circuit another input connected to said clock and an output connected to said second counter.

52. The instrument of claim 50 including a processor operatively connected to said arithmetic unit for causing said arithmetic unit to divide a constant by said T digital signal for producing a signal representing the rate of engine rotation.

53. An electronic test instrument for a rotating, piston driven internal combustion engine comprising:

means for generating a signal representing the time of occurrence of a firing event in the engine;

means for generating a position signal representing the time a predetermined piston in the engine arrives at a predetermined point within a cylinder;

means responsive to said firing event signal and said position signal for generating a t pulse signal wherein said t pulse signal has a pulse width proportional to t the time duration from said firing event to the time said piston reaches said predetermined point within the cylinder;

means for generating a T pulse signal wherein said T pulse signal has a pulse width proportional to T the time of rotation of the engine;

first means for converting said t signal pulse width into a first electrical quantity representing t;

second means for converting said T signal pulse width into a second electrical quantity representing T;

electronic means for dividing said first electrical quantity by said second electrical quantity to generate a timing angle signal; and means for dividing a predetermined reference constant by said second electrical quantity to generate a signal representing the rate of engine rotation.

54. An electronic test instrument for a rotating, piston driven internal combustion engine comprising:

means for generating a signal representing the time of occurrence of a firing event in the engine;

means for generating a position signal representing the time a predetermined piston in the engine arrives at a predetermined point within a cylinder;

means responsive to said firing event signal and said position signal for generating a t pulse signal wherein said t pulse signal has a pulse width proportional to t the time duration from said firing event to the time said piston reaches said predetermined point within the cylinder;

a clock signal generator;

means for generating a T pulse signal including a counter responsive to said position signal wherein said T pulse signal has a pulse width proportional to T the time of one engine revolution;

first means including a counter responsive to said t signal pulse width for converting said t signal pulse width into a t digital signal;

second means including a counter responsive to said T signal pulse width for converting said T signal pulse width into a T digital signal; and electronic means including a digital arithmetic unit for dividing said t digital signal by said T digital signal to generate a timing angle signal.

55. An electronic test instrument for a rotating, piston driven internal combustion engine comprising:

means for generating a signal representing the time of occurrence of a firing event in the engine;

means for generating a position signal representing the time a predetermined piston in the engine arrives at a predetermined point within a cylinder;

means responsive to said firing event signal and said position signal for generating a t pulse signal wherein said t pulse signal has a pulse width proportional to t the time duration from said firing event to the time said piston reaches said predetermined point within the cylinder;

means for generating a T pulse signal wherein said T pulse signal has a pulse width proportional to T the time of rotation of the engine;

first means for converting said t signal pulse width into a first electrical quantity representing t;

second means for converting said T signal pulse width into a second electrical quantity representing T;

electronic means for dividing said first electrical quantity by said second electrical quantity to generate a timing angle signal; and means responsive to said firing event signal for measuring the duration angle of said firing event.

56. The instrument of claim 55 wherein said means for measuring said firing event duration angle includes:

means for generating a signal representing the time duration of said firing event;

means for applying said time duration signal to said electronic dividing means for dividing said time duration signal by said second electrical quantity.

57. The instrument of claim 56 wherein said means for measuring said firing event duration angle includes:

switch means for switching the input of said electronic dividing means from said first electrical quantity to said time duration of said firing event signal.

58. An electronic test instrument for a rotating, piston driven internal combustion engine comprising:

means for generating a signal representing the time of occurrence of a firing event in the engine;

means for generating a position signal representing the time a predetermined piston in the engine arrives at a predetermined point within a cylinder;

means responsive to said firing event signal and said position signal for generating a t pulse signal wherein said t pulse signal has a pulse width proportional to t the time duration from said firing event to the time said piston reaches said predetermined point within the cylinder;

means for generating a T pulse signal wherein said T pulse signal has a pulse width proportional to T the time of rotation of the engine;

first means for converting said t signal pulse width into a first electrical quantity representing t;

second means for converting said T signal pulse width into a second electrical quantity representing T;

electronic means for dividing said first electrical quantity by said second electrical quantity to generate a timing angle signal; and
a calibration circuit which includes:
a pulse generator;
a multistage counter operatively connected to said pulse generator;
means for connecting a first output from said multistage counter to said t pulse signal generating means resulting in said t pulse width representing a first predetermined time duration; and
means for connecting a second output from said multistage counter to said T pulse signal generating means resulting in said T pulse width representing a second predetermined time duration greater than said first predetermined time duration.

59. An electronic test instrument for a rotating, piston driven internal combustion engine comprising:
means for generating a signal representing the time of occurrence of a firing event in the engine;
means for generating a position signal representing the time a predetermined piston in the engine arrives at a predetermined point within a cylinder;
means responsive to said firing event signal and said position signal for generating a t pulse signal wherein said t pulse signal has a pulse width proportional to t the time duration from said firing event to the time said piston reaches said predetermined point within the cylinder;
means for generating a T pulse signal wherein said T pulse signal has a pulse width proportional to T the time of rotation of the engine;
first means for converting said t signal pulse width into a first electrical quantity representing t;
second means for converting said T signal pulse width into a second electrical quantity representing T;
electronic means for dividing said first electrical quantity by said second electrical quantity to generate a timing angle signal;
a calibration circuit which further includes:
a pulse generator;
a counter operatively connected to said pulse generator for generating an output pulse signal whose width is a fixed fraction of its period;
means for connecting said counter output pulse signal to said t pulse signal generating means resulting in said t pulse width representing a first predetermined time duration; and
means, including a signal inverter, for connecting said counter output pulse signal to said T pulse signal generating means resulting in said T pulse width representing a second predetermined time duration greater than said first predetermined time duration.

60. An electronic test instrument for a rotating, piston driven internal combustion engine comprising:
means for generating a signal representing the time of occurrence of a firing event in the engine;
means for generating a position signal representing the time a predetermined piston in the engine arrives at a predetermined point within a cylinder;
means responsive to said firing event signal and said position signal for generating a t pulse signal wherein said t pulse signal has a pulse width proportional to t the time duration from said firing event to the time said piston reaches said predetermined point within the cylinder;
means for generating a T pulse signal wherein said T pulse signal has a pulse width proportional to T the time of rotation of the engine;
first means for converting said t signal pulse width into a first electrical quantity representing t;
second means for converting said T signal pulse width into a second electrical quantity representing T;
electronic means for dividing said first electrical quantity by said second electrical quantity to generate a timing angle signal;
means for selectively disconnecting said t pulse signal generating means from said position signal generating means;
means, operatively connected to said selective disconnecting means and said t pulse signal generating means, for generating said t pulse signal;
means for selectively connecting said T pulse signal generating means to said firing event signal generating means to generate said T pulse signal; and
means connected to said T pulse signal generating means for generating a strobe light trigger signal.

* * * * *